United States Patent [19]

Stocker

[11] 4,031,637

[45] June 28, 1977

[54] TREE TRANSPLANTING MACHINE

[76] Inventor: Walbert A. Stocker, Jordan, Minn. 55352

[22] Filed: July 14, 1976

[21] Appl. No.: 705,095

[52] U.S. Cl. .................................. 37/2 R; 83/928
[51] Int. Cl.² ....................................... A01B 13/00
[58] Field of Search ................. 37/2 R, 2 P; 47/37; 83/928

[56] References Cited

UNITED STATES PATENTS

| | | | |
|---|---|---|---|
| 3,017,707 | 1/1962 | Sigler et al. | 37/2 R |
| 3,017,719 | 1/1962 | Sigler et al. | 37/2 R X |
| 3,142,197 | 7/1964 | Le Tourneau | 37/2 R X |
| 3,364,601 | 1/1968 | Korenek | 37/2 R |
| 3,460,277 | 8/1969 | Grover et al. | 37/2 R |
| 3,558,177 | 1/1971 | Snead | 37/2 R X |
| 3,589,039 | 6/1971 | Korenek | 37/2 R X |
| 3,618,234 | 11/1971 | Bates | 37/2 R |
| 3,713,234 | 1/1973 | Grover | 37/2 R |
| 3,936,960 | 2/1976 | Clegg | 37/2 R |
| 3,958,613 | 5/1976 | Herz | 37/2 R X |

FOREIGN PATENTS OR APPLICATIONS 2,353,828  10/1973  Germany .......................... 37/2 R Primary Examiner—E. H. Eickholt
Attorney, Agent, or Firm—Burd, Braddock & Bartz

[57] ABSTRACT

A ring stand splits to encompass a tree to be transplanted and then is formed back into a circular ring in approximately concentric relationship to the tree. A plurality of curved hollow stanchions extend upwardly from the stand, and a curved spoon is slidably mounted with respect to each of the stanchions and the stand for movement between a position above the earth and a position down into the earth to join with all of the other spoons to separate from the earth a tree ball consisting of the tree's roots and the earth surrounding those roots inside of the spoons. To power the spoons, a rack is provided on an inwardly facing portion of each of the spoons and a matching rack is provided on an outwardly facing portion inside of each of the hollow stanchions. Pinions are situated in meshing relationship to each rack, and a hydraulic linear motor is provided to move the pinions to cause a movement by the associated spoons to be twice that of the pinions. Power means including a vehicle are provided to lift the ring stand, spoons and stanchions and the tree and tree ball from the earth; to tip this assemblage; to transport it to the location where it is to be transplanted; and to deposit it into a previously prepared opening of the same size.

11 Claims, 12 Drawing Figures

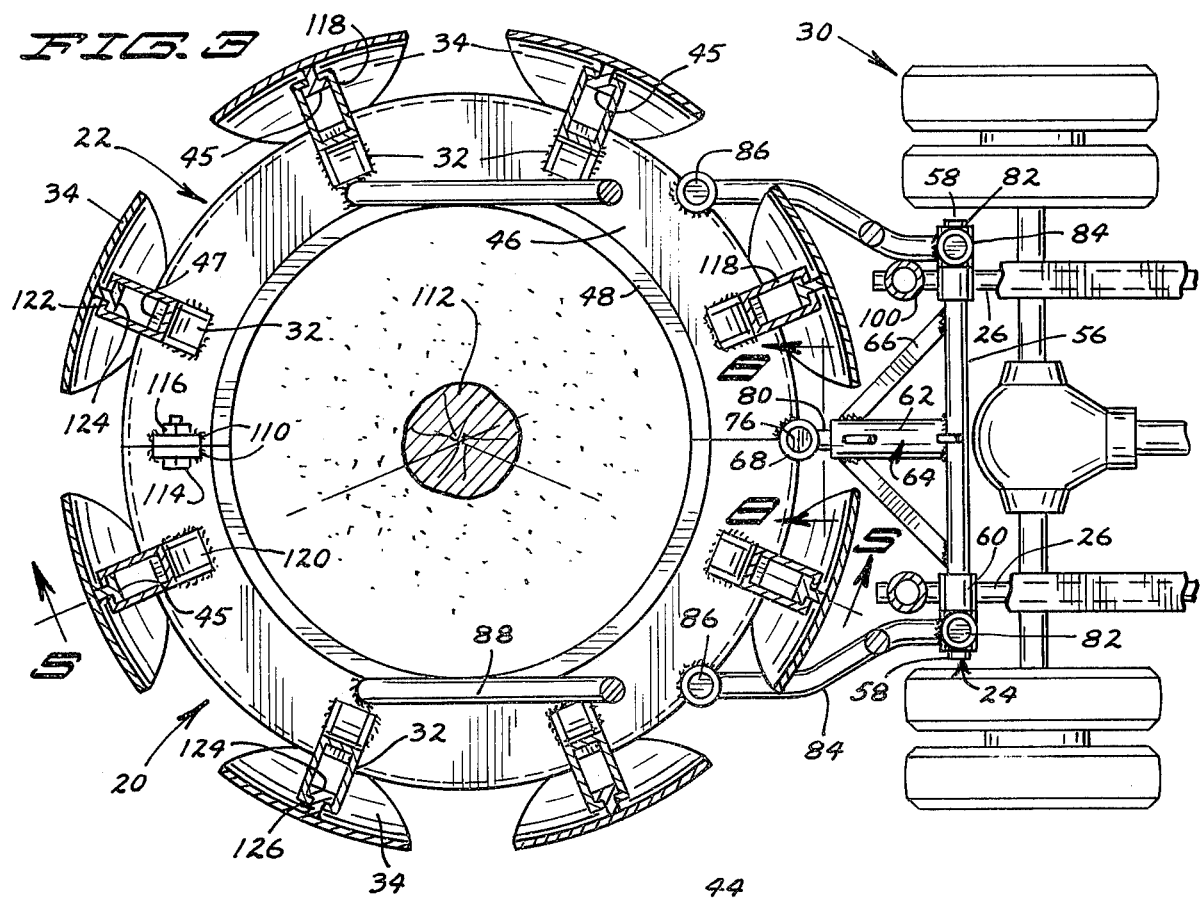
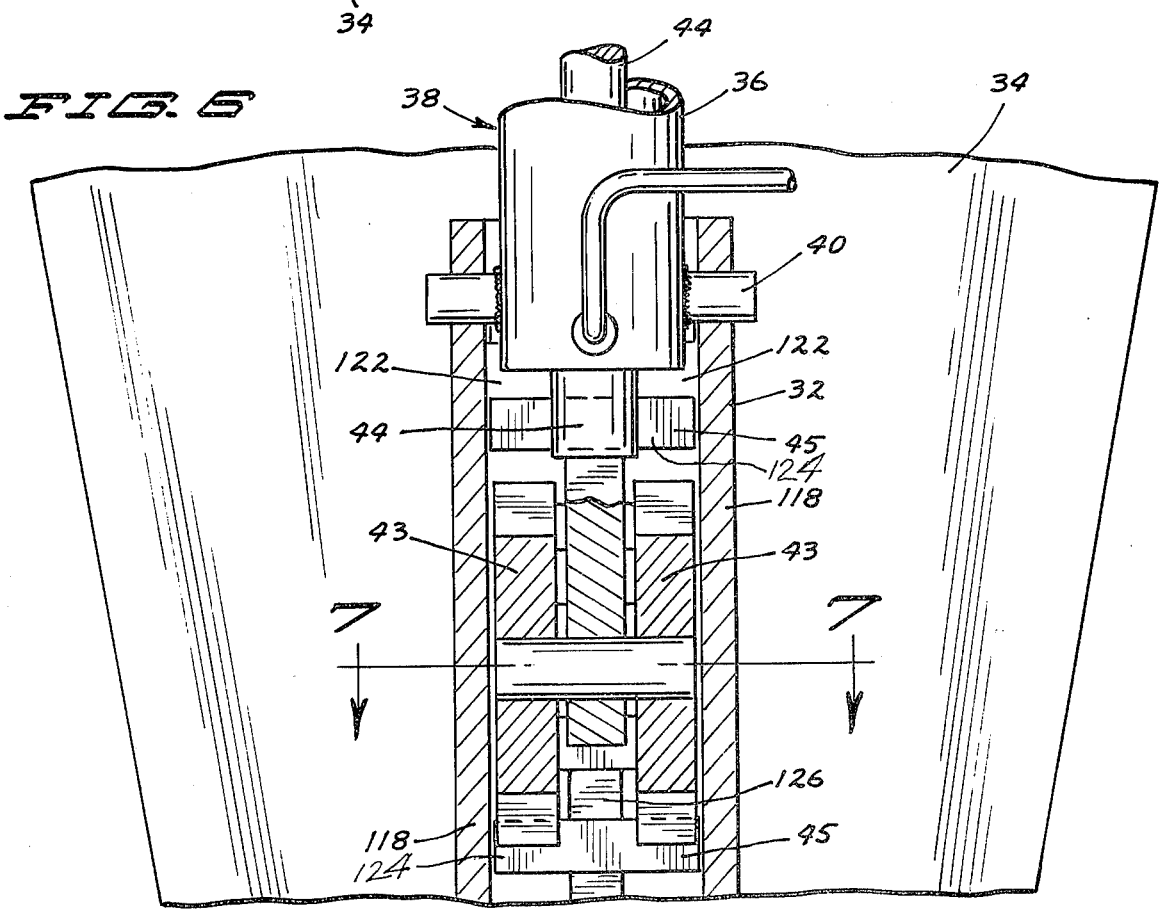

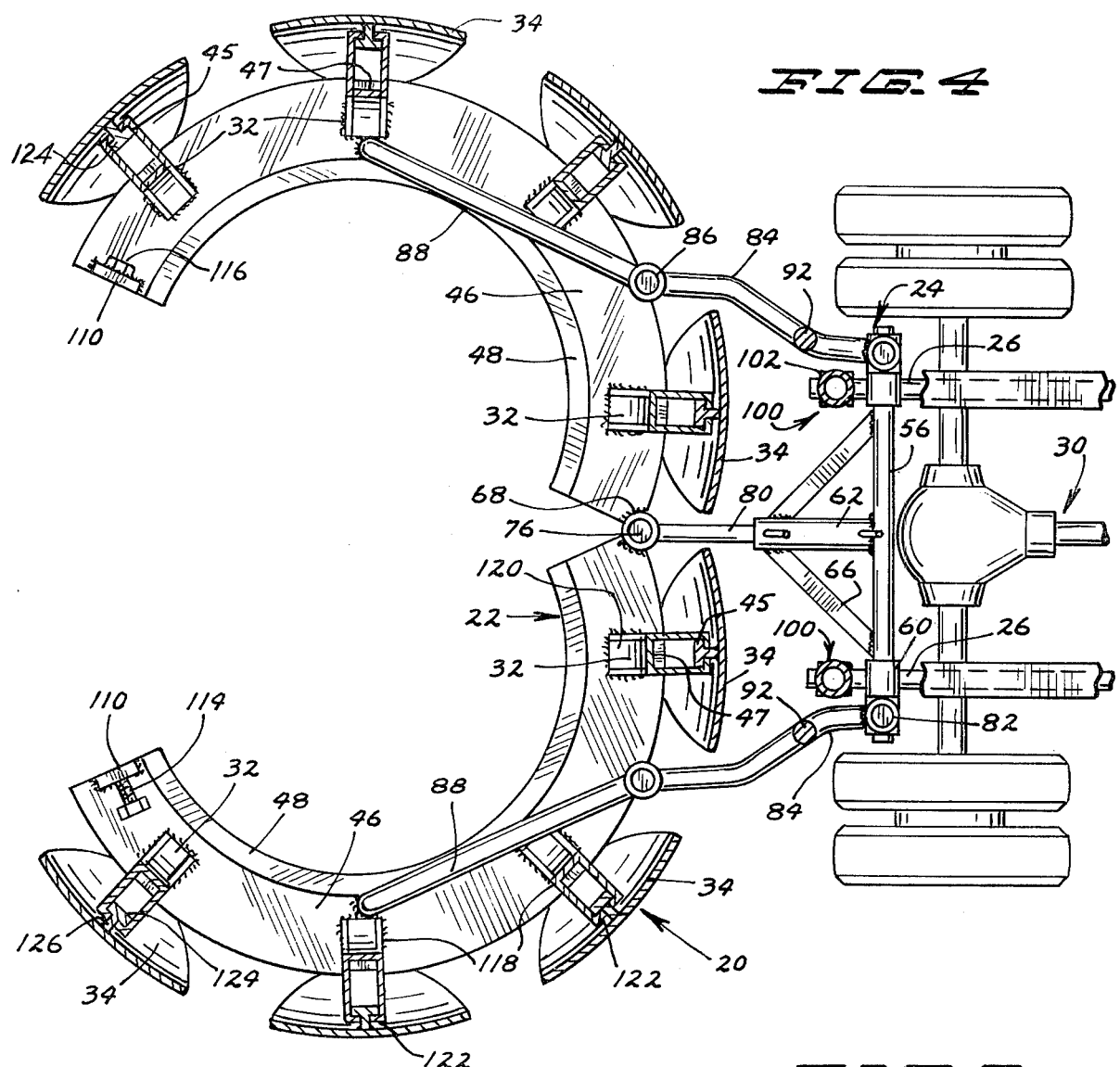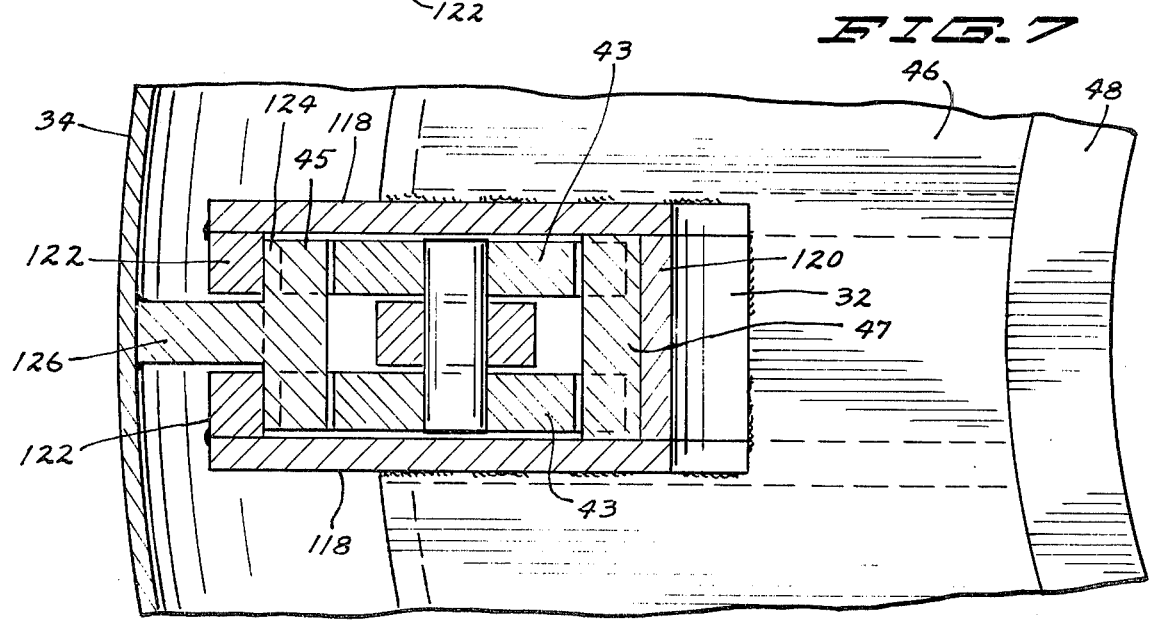

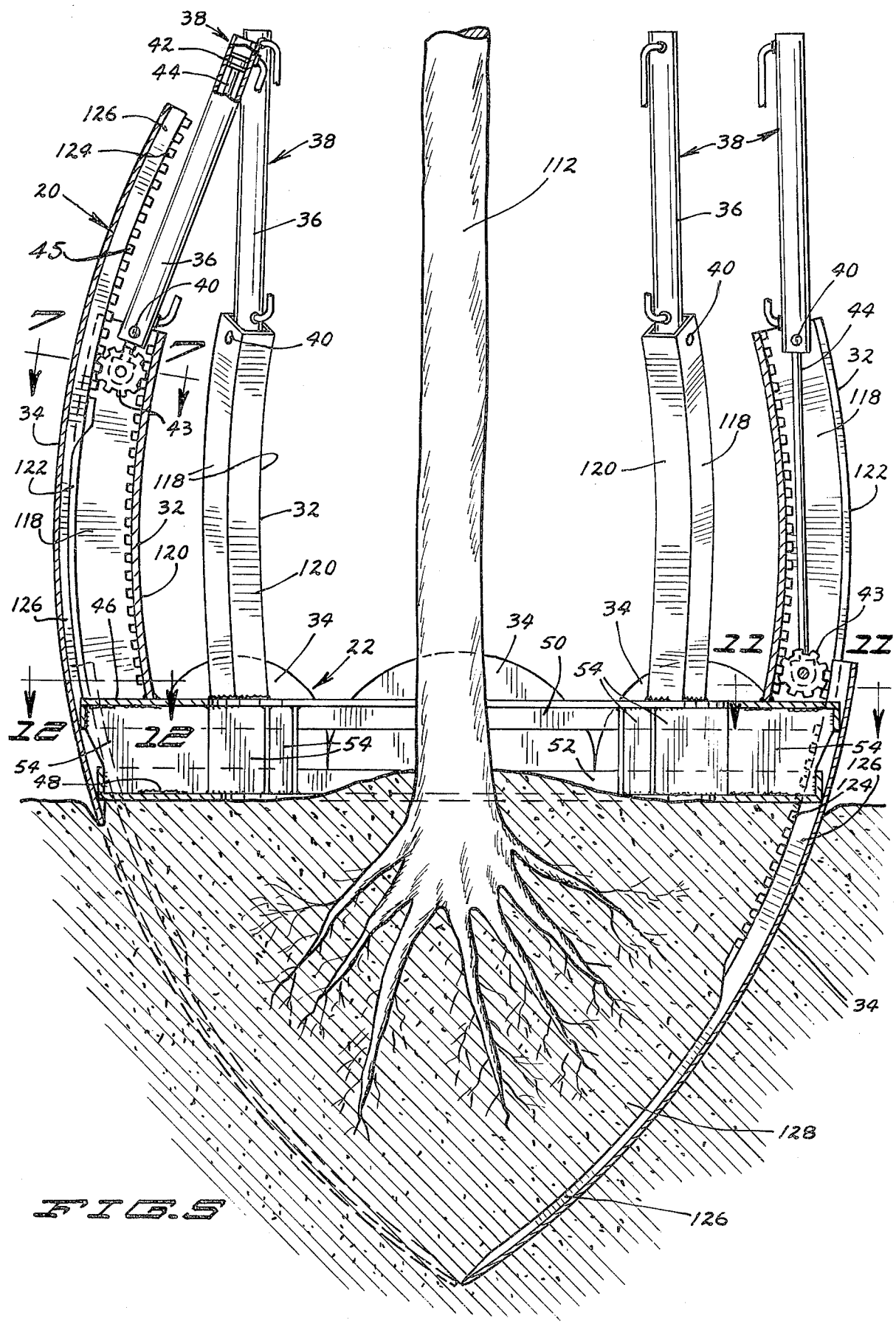

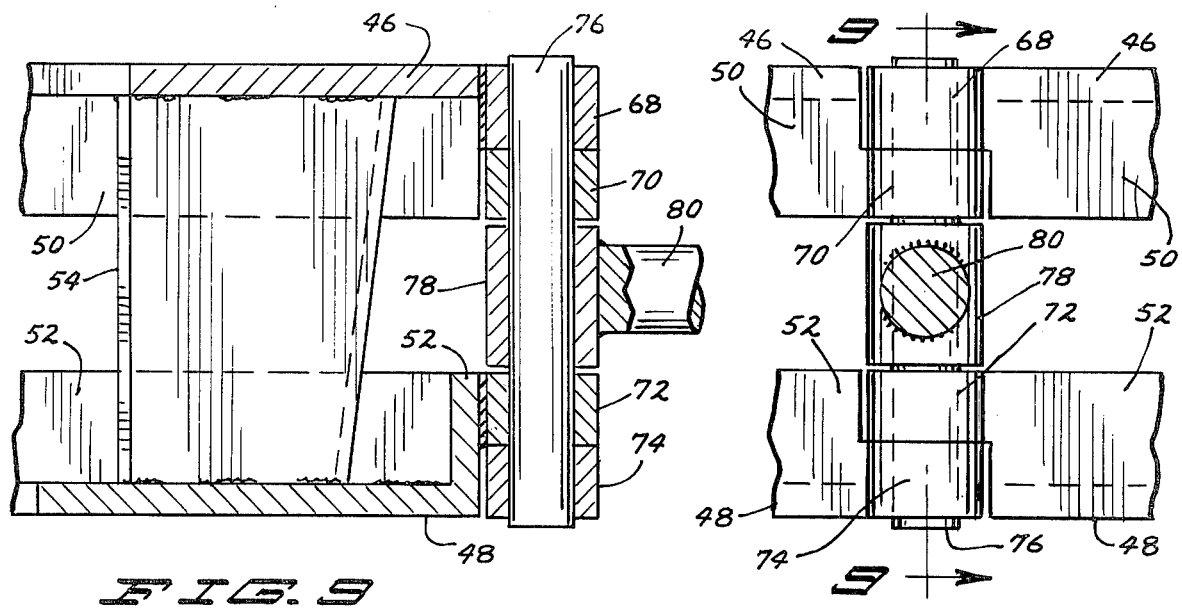
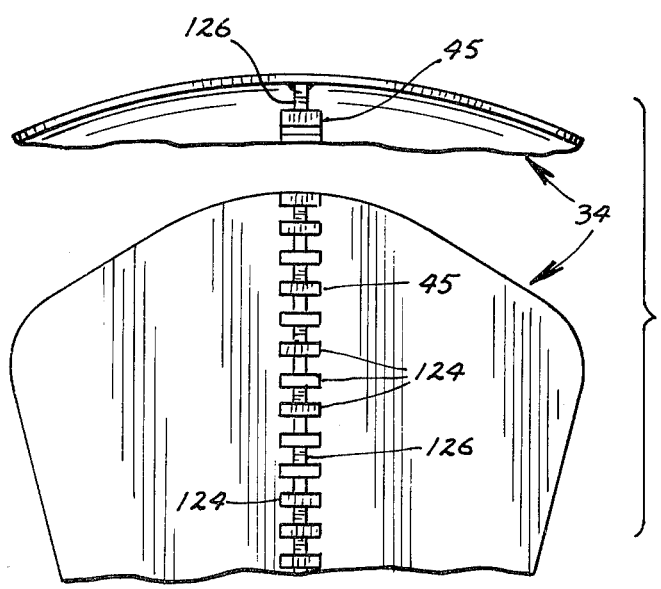
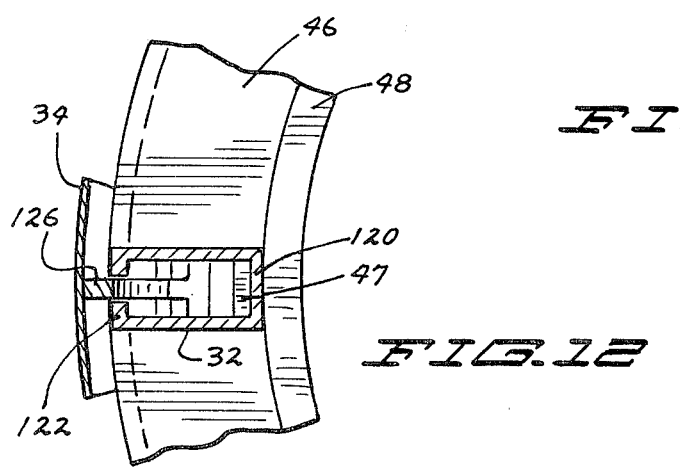
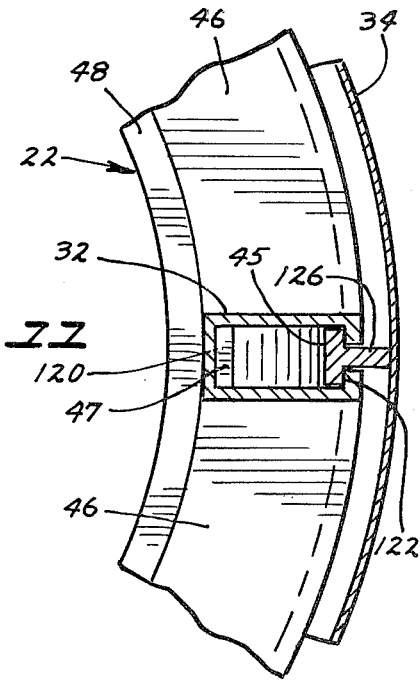

TREE TRANSPLANTING MACHINE

BACKGROUND OF THE INVENTION

For a great many years it has been known to force curved blades into the earth around a tree to be moved to isolate its root structures and the surrounding earth into a roughly semi-circular tree ball that can be lifted from the ground and moved to the desired new location for the tree and reinserted in a prepared hole in the ground. See the patent to Wilkens, U.S. Pat. No. 594,668, granted in Nov. of 1897.

It is also well known to provide hoops to serve as guides for the tree digging staves which are to be pushed into the ground, and to have these hoops split so that they can be assembled around the tree. See the patent to Sager, U.S. Pat. No. 1,599,841, granted in Sept. of 1926. To utilize the device of the Sager patent, each of the staves or digging blades had to be pounded into the ground manually.

It is known to utilize racks and gears to force cutting blades or flat digging spoons down into the ground in a tree balling device. See the patent to Wassell et al, U.S. Pat. No. 2,769,278, granted in Nov. of 1956. In this structure, the rack must extend down to the lower edge of the cutting blade and thus the rack offers substantial resistance to being forced into the ground.

It is well known to use hydraulic piston-cylinder linear motors to drive digging blades into the ground and to pull them out again. See the patent to Bates, U.S. Pat. No. 3,618,234, granted in Nov. of 1971.

It is also well known to utilize hydraulic powered lifting devices to lift tree moving assemblies, trees, and tree balls to tilt them to a convenient position for transportation, to transport them on a vehicle and then to tilt them and lower them to place the tree in an opening previously prepared. See the previously mentioned patent to Bates, and the patent to Crawford, U. S. Pat. No. 2,990,630, granted in July of 1961.

In these days of high labor costs, however, it is necessary or at least very highly desirable to provide a tree transplanting machine which is entirely power operated, and which machine, together with the vehicle to which it is attached, can be operated by one man.

In order to get underneath the branches of a large tree having low branches, without injuring or removing those branches, it is necessary that the vertical above-ground clearance of the machinery which must encompass the tree trunk be kept just as low as possible. In the prior art structures, typically, the ratio of movement of the hydraulic cylinder piston motor to that of the digging blades had been one-to-one. See the previously mentioned patent to Bates. In some structures of the prior art, in order to gain more power, a reverse ratio has been used whereby the movement of the blades into the ground is only one-half of that of the movement of the power means forcing the blades into the ground. See the patent to Sigler et al, U.S. Pat. No. 3,017,719, granted in Jan. of 1962.

In structures such as shown in the aforementioned patent to Bates, the digging blades are straight in longitudinal dimension and must be forced into position by upwardly extending straight hydraulic motors. To handle trees of large sizes, this necessarily results in a structure which is too wide to be carried down the highway.

To minimize the resistance to the digging action as each of the digging spoons is forced down into the ground, it is important that the spoons be kept as clear of the machinery as possible and that a very minimum of the machinery parts be forced down into the ground. It is equally important that any such parts are self-cleaning in nature so that they will not clog up the workings of the machine when they are taken back out of the ground by use of the power means.

To overcome difficulties with the prior art structures and to provide an improved tree transplanting machine, the present invention was developed.

BRIEF SUMMARY OF THE INVENTION

A ring stand adapted to be supported on the ground in encircling relation to a tree to be transplanted is split and is mounted with respect to a vehicle so that it can be supported above the surface of the ground by the vehicle, moved to an opened and split condition, around a tree to be transplanted, closed and fastened to form a unitary ring, and supported on the surface of the ground in concentric relationship to the tree to be transplanted.

A plurality of digging spoons are evenly positioned around the outer periphery of the ring stand and are guidably supported with respect to stanchions extending upwardly from the ring stand.

On each stanchion, powered means is provided to force the digging spoons downwardly into the earth. In the form of the invention as shown, a rack is provided on the upper half of each digging spoon, and a parallel, spaced apart cooperating rack is provided on its associated stanchion. The powered means is a hydraulic piston-cylinder linear digging motor, and the rod end of the cylinder is pivotally mounted to the top of the stanchion. Pinions operably associated with the racks on both the spoon and the stanchion are rotatably mounted with respect to the piston rod of the piston-cylinder motor.

Suitable controls are provided to cause each of the linear digging motors to force each of the curved digging spoons into the ground until all the spoons cooperate with each other to isolate a tree ball consisting of the tree roots and the earth surrounding the roots.

At this point, power means are provided to lift the entire transplanting machine, tree and tree ball, and to tip the tree to a position convenient for transportation. The vehicle then moves to a location where an opening of similar configuration to the tree ball has been previously prepared, and the digging spoons of the machine together with the tree ball are lowered into this opening.

The digging motors are reversed, and each digging spoon removed, thus leaving the tree transplanted in its new location. The ring stand is unfastened and split so that the vehicle can drive the machine away from the tree.

IN THE DRAWINGS

FIG. 3 is a horizontal sectional view taken on the line 3—3 in FIG. 1;

FIG. 4 is also a horizontal sectional view taken on the line 3—3 in FIG. 1, but showing a ring stand of the machine in split position;

FIG. 5 is a vertical sectional view taken on the line 5—5 in FIG. 3 showing a plurality of digging spoons of the transplanting machine in their final dug-in position and showing one such digging blade in its preliminary, predigging position;

FIG. 6 is an enlarged vertical sectional view taken on the line 6—6 in FIG. 1;

FIG. 7 is a horizontal sectional view taken on the line 7—7 in FIGS. 5 and 6;

FIG. 8 is an enlarged vertical sectional view taken on the line 8—8 in FIG. 3;

FIG. 9 is a vertical sectional view taken on the line 9—9 in FIG. 8;

FIG. 10 is a composite fragmentary top plan and elevational view of an upper portion of a digging spoon of the invention;

FIG. 11 is a horizontal fragmentary sectional view taken on the line 11—11 in FIG. 5; and FIG. 12 is a horizontal fragmentary sectional view taken on the line 12—12 in FIG. 5.

DESCRIPTION OF PREFERRED EMBODIMENT

Figure 1:
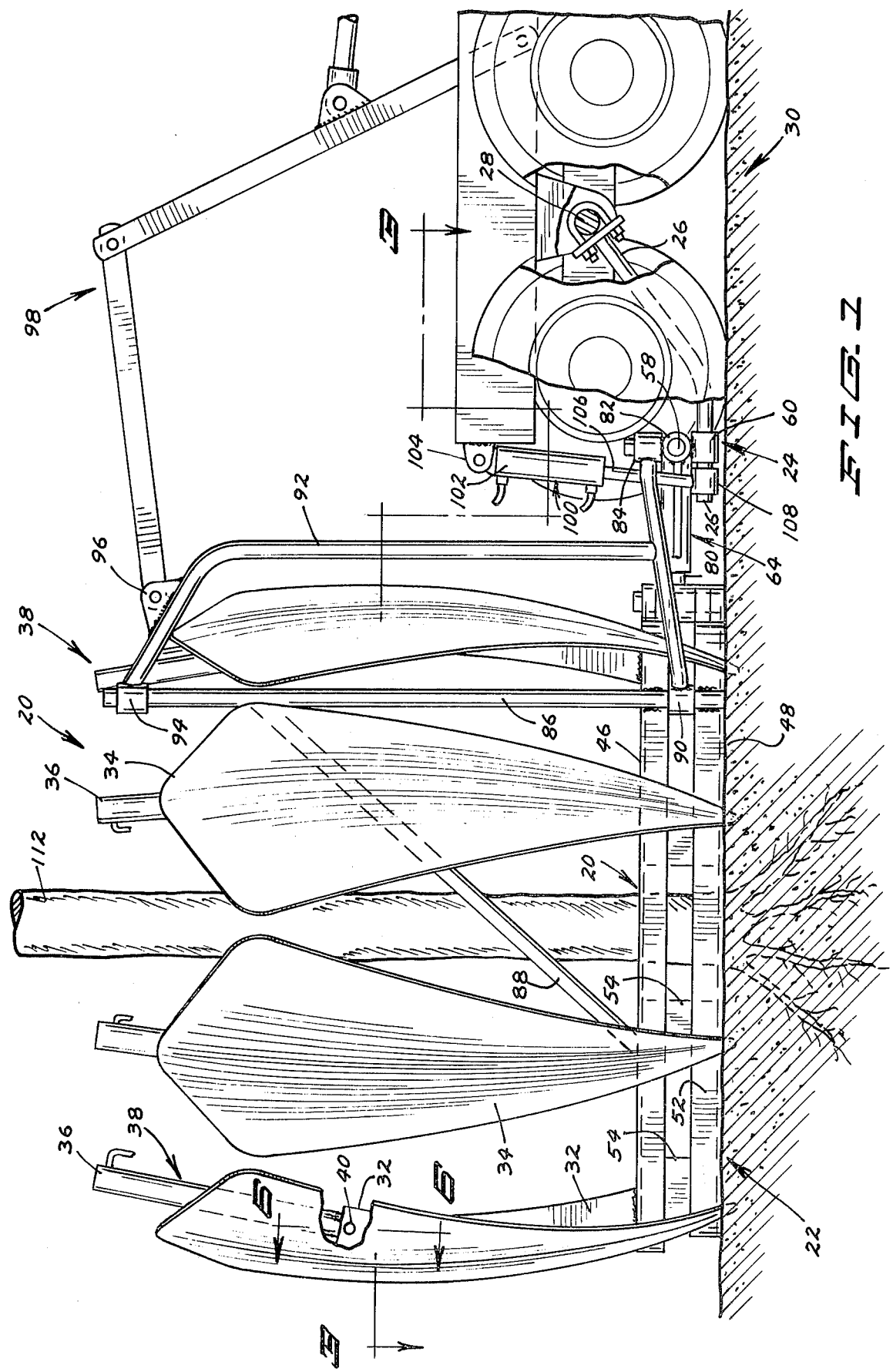
FIG. 1 is a side elevational view of a tree transplanting machine of the invention shown in its relationship to a tree to be transplanted just prior to commencement of the digging operation and showing its relationship to the rear of a vehicle for transporting the transplanting machine.

A tree transplanting machine 20 includes a split ring stand 22 pivotally mounted by a mounting means 24 to ring stand support arms 26,26. These stand support arms 26,26 are pivotally mounted as at 28 to a vehicle 30.

Welded onto a split upper disc 46 of the ring stand and symmetrically spaced around it are a plurality of hollow, curved, upstanding stanchions 32. Eight stanchions are shown herein, but six, four or some other number will work satisfactorily. Each of these stanchions guidably supports a digging spoon 34 in a manner to be described.

A cylinder 36 of a hydraulic linear piston-cylinder digging motor 38 is pivotally mounted adjacent its rod end to an upper portion of each stanchion 32 as at 40. A piston rod 44 of each such linear digging motor 38 is connected to a piston 42 thereof. Digging spoon drive pinions 43,43 are rotatably mounted, one on each of opposite sides of the outer ends of each piston rod 44. A digging spoon rack 45 is integral with and extends outwardly from the upper half of the inner surface of each digging spoon 34. A stanchion rack 47 is integral with an interior surface of the stanchion 32 and is in parallel spaced apart relationship with respect to the digging spoon rack 45. Pinions 43,43 are each located in meshing, operational relationship with respect to both the digging spoon rack and the stranchion rack.

As the linear digging motor 38 is operated, piston 42 and piston rod 44 force the digging spoon drive pinions 43,43 either down or up with respect to the stanchion. Since the stanchion rack 47 is fixed to its stanchion, this causes the digging spoon rack 45 and hence its digging spoon 34 to be moved twice as far as the linear motor piston rod and the pinions move.

While a double rack and pinion arrangement is effective to obtain this "two-for-one" motion, other similar means could also be used. For example, a sheave could be placed on each side of the outer end of the piston rod 44 and cables dead-ended to each end of the stanchions. The cables would each pass around one of the sheaves and be fastened to spaced apart points along the digging spoon. Similar cable arrangements could give spoon movement three or more times as great as piston rod movement.

The split ring stand 22, in addition to the split upper disc 46 includes a matching split lower disc 48. The upper disc is provided with an integral downwardly extending upper disc skirt 50; while the lower disc 48 is provided with an integral upwardly extending lower disc skirt 52. A pair of gusset plates 54,54 are welded between the upper and lower discs in approximate alignment with each of the stanchions 32. The stanchions are secured by welding to the upper surface of the upper disc 46 just opposite where these gusset plates 54,54 are secured to the lower surface of the upper disc by welding.

As seen in FIGS. 1, 2, 3 and 4, the pivotal mounting means 24 includes a hollow ring stand pivot bar 56, which is pivotally mounted over a solid ring stand pivot rod 58. Also mounted on pivot rod 58 are two mutually perpendicular collars, together indicates as 60. The lower collar being permanently affixed to the outer end of each ring stand support arm 26, and the upper collar being pivotally received on the ring stand pivot rod 58.

The hollow ring stand pivot bar 56 has a cylinder 62 of a ring splitting hydraulic linear motor 64 integral therewith and extending outwardly therefrom. This cylinder is supported by brackets 66,66 with respect to bar 56.

As best seen in FIG. 8 and FIG. 9, the inner split edges of each half of the split ring stand 22 are joined to each other at overlapping collars 68 and 70 each welded to one of the two upper one-half discs 46 and collars 72 and 74 are each welded to one of the two one-half lower discs 48. These collars are held in pivotal relation to each other by a vertical pivot pin 76 which is attached through a collar 78 to a piston rod 80 of the ring splitting hydraulic linear motor 64.

Each of the halves of the split ring stand 22 are independently supported in pivotal relationship to the outer ends of ring stand support arms 26,26 by a collar and boss 82 which is pivotally mounted on the ring stand pivot rod 58 and by a collar and split ring swing arm 84 pivotally mounted on the boss portion of the collar and boss 82. A vertical split ring control pole 86 is integral with and extends upwardly from each of the halves of the split ring stand 22; and a diagonal control pole brace 88 extends from an upper portion of the pole to a outwardly extending portion of its half of the ring stand.

A forward end of the ring swing arm 84 includes an additional collar 90 which is rotatably mounted about the split ring control pole 86 between the split upper disc 46 and the split lower disc 48. A vertical swing arm brace 92 is integral with ring swing arm 84, extends upwardly therefrom, and terminates in a collar 94 which is rotatably mounted with respect to an upper end portion of the split ring control pole 86. Each of these braces 92 are provided with ears 96, both of which are pivotally connected to mechanism indicated generally at 98 for tipping the split ring stand 22 about the horizontal axis of the ring stand pivot rod 58.

Figure 2:
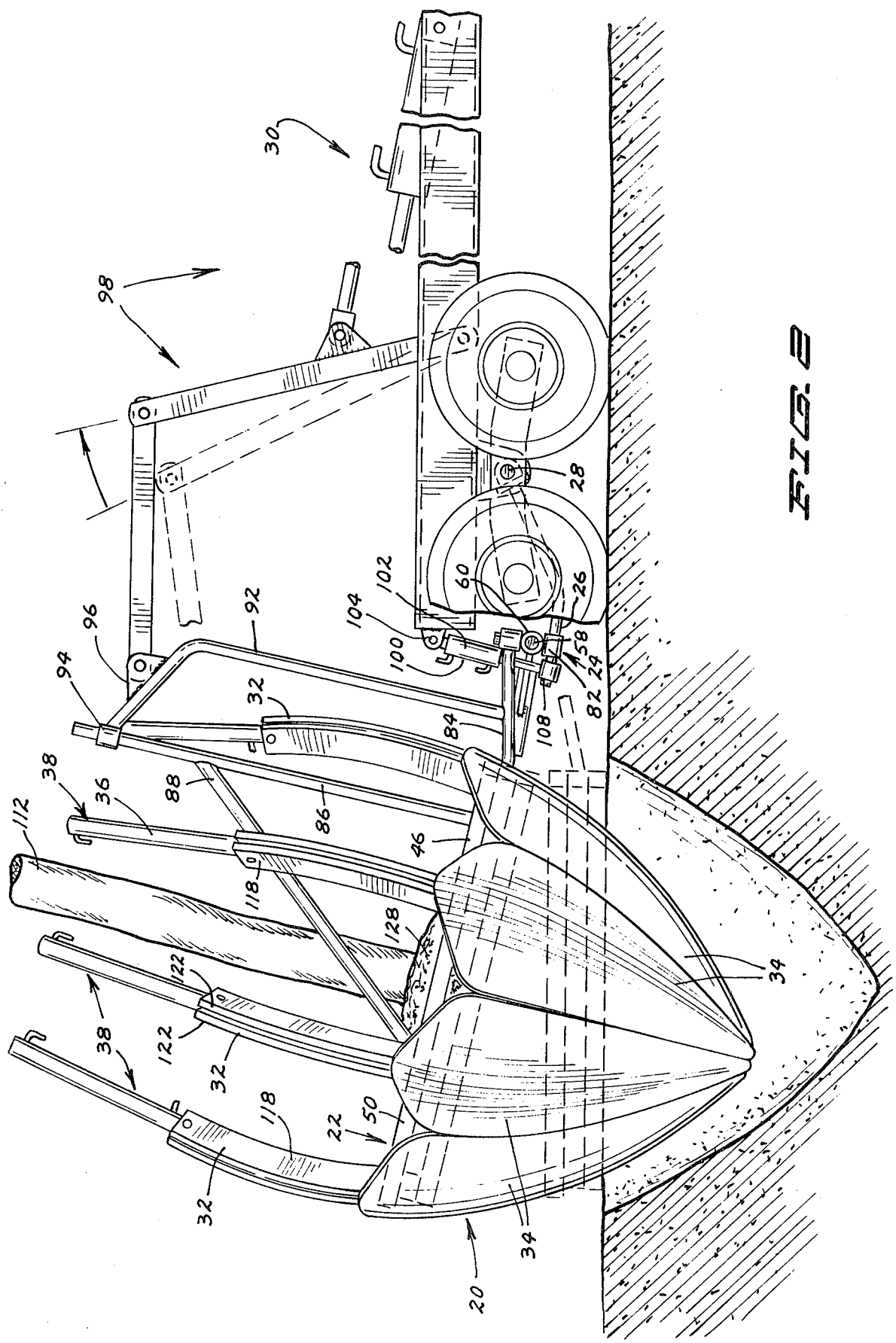
FIG. 2 is a side elevational view of the tree transplanting machine and a portion of the vehicle of FIG. 1 but illustrating the positioning of the machine, the tree and a tree ball being lifted from the ground.

As best seen in FIG. 2, this mechanism 98 includes other linkages pivotally connected to the vehicle 30, and a hydraulic linear motor for controlling those linkages. It is by controlling these mechanisms indicated generally at 98 that the split ring stand can be moved between the angular position as seen in FIG. 2 and the horizontal position as seen in FIG. 1. For transport over the road, this same mechanism is utilized to tip the split ring stand and the tree and ball then associated therewith to position in clearing relationship to the roadway over which the tree is to be carried.

The horizontal positioning of the split ring stand 22 is controlled, not so much by the mechanism 98, as by a pair of hydraulic linear stand height control motors 100,100, each of which includes a cylinder 102 pivotally mounted as at 104 to the frame of the vehicle 30, and a piston (not shown) and piston rod 106 each of which is pivotally mounted as at 108 to an outer end of one of the ring stand support arms 26.

The outer ends of each half of the split ring stand 22 are provided with upstanding ears 110,110 on the split upper disc 46. After the split ring has been positioned to encompass a tree 112 to be transplanted, a bolt 114 is passed through both of the ears 110,110 and into a nut 116 to securely and temporarily fasten the ring stand into one unit.

Each of the stanchions 32 forms a positive guide and lateral support for its associated digging spoon 34. Each spoon is curved in such a manner that it will move smoothly into the earth, and each stanchion is curved so that its spoon will move in precise parallel relationship to it.

Each hollow stanchion 32 includes spaced apart parallel side walls 118,118, and integral curved solid back wall 120, and a slotted front wall, curved to lie in parallel spaced relation to the back wall and constituted as a pair of mutually aligned spaced apart flanges 122,122, each extending inwardly from one of the side walls 118.

Each digging spoon rack 45 is constituted as a plurality of spaced apart spoon rack bars 124. These rack bars are supported as by welding on a digging spoon rib 126 which is, itself, supported as by welding down a longitudinal center of its associated digging spoon 34.

As best seen in FIG. 7, the front wall flanges 122,122 of the stanchion 32, together with the side walls 118,118 thereof form a T-slot to positively position the rack bars 124 of the spoon rack 45 with respect to the stanchion. This construction not only positively supports and guides the vertical up and down movement of the digging spoons 34, but also insures that the pinions 43,43 will be in proper meshing relationship with respect to both the digging spoon rack 45 and the stanchion rack 47.

OPERATION

To prepare to transplant a tree, the bolt 114 and nut 116 will be disconnected, and ring stand height control motors 100 will be activated to bring the two halves of the split lower disc 48 of the ring stand 22 into clearing relationship with respect to the ground. Ring splitting hydraulic linear motor 64 will then be elongated to cause its piston rod 80 to force vertical pivot pin 76 outwardly from position as seen in FIG. 3 to position as seen in FIG. 4 thus forcing the two halves of the split ring 22 apart as shown in FIG. 4.

Vehicle 30 will be backed toward the tree 112 to be transplanted, and when the halves of the split ring are properly positioned, ring splitting motor 64 will be contracted to bring the parts back to the position as seen in FIG. 3. The bolt 114 and the nut 116 will then be used to lock the ring stand 22 into a unitary complete and solid ring.

Ring stand height control motors 100,100, will be lowered or relaxed to allow the ring stand 22 to rest on the ground and to cause the tips of the digging spoons 34 to penetrate the ground in concentric relationship to the tree 112, all as seen in FIG. 1.

Next hydraulic fluid will be introduced into the top portion of each of the cylinders 36 of the digging motors 38 to move pinions 43,43 in downward direction so as to force the digging spoons 34 in a similar direction but at double the distance traveled by the pinions.

While a hydraulic power source associated with the vehicle 30 could be sufficiently large and powerful to force all of the spoons into the ground at the same time, it is more satisfactory to force the spoons into downward position one at a time. The weight of the entire machine is then available to react against the digging force of first one or two spoons. The "dug-in" spoons themselves also then serve to react against the digging force of subsequent spoons.

One or two linear motors can be moved from stanchion to stanchion to force the blades down one after another in their turn if necessary.

In order to get uniform digging action and to overcome and tendency for strains to develop due to canting, two digging spoons oppositely disposed across the ring stand can be activated at any one time.

When obstructions are encountered, and the progress of a digging spoon is slowed or blocked, the particular digging motor 38 can be reciprocated by reversing the force of hydraulic pressure on either side of the piston 42. In this manner an obstruction can be pushed to one side or broken through as the case may be. Using this technique, the present inventor has actually encountered old foundations including building stone and cement blocks, and has actually encapsulated portions of such a structure within the tree ball.

Such reciprocation can be over a relatively long distance or stroke, or over a relatively short stroke. In fact, machines which cause the digging spoons to vibrate furnish the ultimate in short-term reciprocation, and such machines, when added to the structure, can under certain circumstances and conditions, allow digging spoons to be moved into the ground with a great reduction of hydraulic power applied.

Once all of the digging spoons 34 have reached position as shown to the right in FIG. 5, the tree roots and the associated earth will have been substantially separated from the earth to form a tree ball 128, and the tree 112 and this tree ball are then ready to be transported to the new location.

Mechanism 98 is then operated to tip the tree, tree ball and ring stand 22 forwardly with respect to the front of the vehicle 30, swinging about the ring stand pivot rod 58 until the ring stand and the spoons are in clearing relationship with respect to the ground on which the vehicle is situated. This tipping can continue until the ring stand 22 is substantially directly above the ring swing arms 84,84. The vehicle is then driven to the new location for the tree, and the mechanism 98 is reversed to lower the tree into a newly provided hole once the vehicle is situated in alignment therewith.

When so situated, the ring stand is lowered to the ground and hydraulic fluid is introduced into the rod end of each of the cylinders 36 of the digging motors 38 to withdraw each of the digging spoons 34 from the ground thus to leave the newly transplanted tree 112 in position as seen in FIG. 1.

The nut 116 and the bolt 114 are separated, ring stand height control motors 100 are contracted to remove the ring stand 22 and the tips of the digging spoons 34 from the ground, ring splitting motor 64 is elongated to split the ring stand 22 from position as seen in FIG. 3 to the position as seen in FIG. 4, and the vehicle is driven away from the newly transplanted tree 112.

When more than one tree is to be transplanted from a first growing area to a second use area, the tree transplanting machine will then be situated in the place where the second tree is to be put, and the transplanting machine will be activated in the manner set out above to separate from the earth a ball of earth which will be of size and shape to receive the second tree.

If desired, this ball of earth can be carried from the area where the trees are to be used back to the growing area, and it and the digging spoons 34 of the ring stand can be lowered down into the hole left by the first tree and tree ball, and the spoons withdrawn thus to fill in this first hole.

Then the second tree can be dug in the manner set out, carried to the newly dug location at the use site, and transplanted therein.

The digging spoon racks 45 extend only from the middle to the top of the inside surface of each digging spoon 34; but with the digging spoon ribs 126 extending virtually the entire length of their digging spoon. Below the racks 45, the maximum dimension of the ribs 126 is substantially reduced. Thus, the passage of each digging spoon into the earth is virtually unimpeded except by the profile of the spoon and the reduced rib themselves until the rack arrives at the surface of the earth. See FIG. 5. At this point, the path for the spoon is pretty well established within the earth, and the additional resistance caused by having to force the rack bars 124 of the digging spoon rack 45 into the ground during the last half of the progress of a particular digging spoon into the ground will not cause difficulty. The earth itself, over the first half of the digging spoon, serves as a guide to continue the spoon on its way in spite of the added resistance caused by the bulk of the digging spoon rack.

Also referring to FIG. 5, when the digging spoons are withdrawn from the ground, the earth clinging to the spaced apart rack bars 124 will be forced by the pinions 43,43 into the area on either side of the digging spoon rib 126 to drop harmlessly down on the interior surface of the digging spoon 34.

A feature of the invention involves the digging motor 38 being pivotally mounted by the rod end of the cylinder 36 to the upper part of the hollow stanchion 32, thus to allow the force exerted by the pinions 43,43 on the digging spoon rack 45 to be virtually a straight downward force designed to most easily cause the spoon to go into the earth, in spite of the fact that the spoon is following a curved path. This relationship is best understood by considering the alignment of the piston rod 44 on the left side of FIG. 5 where the digging motor 38 is fully contracted and the force is being applied substantially exactly parallel to the desired direction of travel of the digging spoon; and the alignment of the piston rod 44 on the right side of FIG. 5 as the digging spoon just reaches the bottom of its movement. With digging motor 38 fully extended, the positioning of piston rod 44 is such that the force on the pinions 43,43 is still virtually exactly parallel with the direction of the final movement of digging spoon 34.

The embodiments of the invention in which an exclusive property or privilege is claimed are defined as follows:

1. A machine for digging trees from the earth, said machine including:
   A. a ring stand;
   B. means for situating said stand in encircling relation to a tree to be transplanted;
   C. a plurality of stanchions extending upwardly from said stand;
   D. a plurality of digging spoons, each mounted for guided, sliding movement with respect to one of said stanchions and with respect to said stand between an upper position situated substantially out of the earth in parallel alignment with its stanchion, and a lower position wherein its lowermost portion meets with the lowermost portions of the other spoons when in said lower position;
   E. said spoons when all in said lower position together isolating and separating the roots of said tree and the earth encompassing the roots and situated inside said spoons from the rest of the earth thus to define a tree ball;
   F. power digging means for selectively moving each spoon between said upper and lower positions;
   G. power lifting means for lifting said machine and tree and tree ball from the earth;
   H. said power digging means includes a linear digging motor adapted to be anchored to an upper portion of each stanchion and having a powered linearly movable rod extending downwardly therefrom;
   I. at least one generally cylindrical actuator rotatably mounted on the downward end of said motor rod; and
   J. means operably assembled with said stanchion, said actuator and its digging spoon for causing said spoon to be moved at least twice the distance of movement of said actuator in response to movement of the actuator in the same direction.

2. The tree digging machine of claim 1 wherein:
   K. the linear digging motor is a hydraulic motor having a cylinder, a piston and a piston rod;
   L. a rod end of its cylinder being mounted to an upper portion of said stanchion; and
   M. said actuator being rotatably mounted on a lower end of said piston rod.

3. A machine for digging trees from the earth, said machine including:
   A. a ring stand;
   B. means for situating said stand in encircling relation to a tree to be transplanted;
   C. a plurality of stanchions extending upwardly from said stand;
   D. a plurality of digging spoons, each mounted for guided, sliding movement with respect to one of said stanchions and with respect to said stand between an upper position situated substantially out of the earth in parallel alignment with its stanchion, and a lower position wherein its lowermost portion meets with the lowermost portions of the other spoons when in said lower position;
   E. said spoons when all in said lower position together isolating and separating the roots of said tree and the earth encompassing the roots and situated inside said spoons from the rest of the earth thus to define a tree ball;
   F. power digging means for selectively moving each spoon between said upper and lower positions;
   G. power lifting means for lifting said machine and said tree and tree ball from the earth;

H. wherein said power digging means includes a hydraulic linear digging motor having a cylinder, a piston and a piston rod;
I. said digging motor cylinder having a rod end thereof pivotally mounted to an upper portion of one of said stanchions; and said digging motor piston rod extending downwardly from said cylinder;
J. a rack integral with and extending away from the stanchion;
K. a rack integral with and extending away from one of said digging spoons in parallel, spaced relation to said stanchion rack; and
L. at least one pinion rotatably mounted on a lower end of said piston rod and in meshing, power transmitting relation of the stanchion rack and the spoon rack.

4. The tree digging machine of claim 3 wherein:
M. each stanchion is evenly curved upwardly and inwarly; and
N. each associated digging spoon is similarly curved.

5. The tree digging machine of claim 4 wherein:
O. each stanchion is hollow and includes a curved back wall which supports the stanchion rack, spaced parallel side walls encompassing the stanchion rack, and a pair of mutually aligned, parallel, spaced apart flanges, each integral with one of the side walls, together forming a slotted curved front wall;
P. each matching digging spoon supports its spoon rack on an inwardly extending curved digging spoon rib in spaced relation to an inner face of the spoon and inside of said hollow stanchion, the spoon rib extending between said stanchion flanges.

6. The tree digging machine of claim 5 wherein:
Q. said spoon rack includes rack bars extending to position inside of said stanchion and extending outwardly from said spoon rack for a greater dimension than the space between said spaced apart stanchion flanges; and
R. said flanges serving as retainers for said spoon rack and as lateral guides for said spoon rib.

7. The tree digging machine of claim 6 wherein: said spoon rack extends only from the upper end of said spoon to about one-half way toward the lower end thereof.

8. The tree digging machine of claim 7 wherein: said spoon rib has a maximum dimension in direction outwardly from the spoon only over that portion of the spoon which includes the spoon rack.

9. A machine for digging trees from the earth, said machine including:
A. a ring stand;
B. means for situating said stand in encircling relation to a tree to be transplanted;
C. a plurality of stanchions extending upwardly from said stand;
D. a plurality of digging spoons, each mounted for guided, sliding movement with respect to one of said stanchions and with respect to said stand between an upper position situated substantially out of the earth in parallel alignment with its stanchion, and a lower position wherein its lowermost portion meets with the lowermost portions of the other spoons when in said lower position;
E. said spoons when all in said lower position together isolating and separating the roots of said tree and the earth encompassing the roots and situated inside said spoons from the rest of the earth thus to define a tree ball;
F. power digging means for selectively moving each spoon between said upper and lower positions;
G. power lifting means for lifting said machine and said tree and tree ball from the earth;
H. wherein said ring stand is split into two semicircular ring stand halves;
I. wherein a vehicle forms a part of said lifting means;
J. means for separately supporting each ring stand half for pivotal movement about one of a pair of symmetrically spaced vertical axes mounted with respect to said vehicle;
K. means pivotally connecting adjacent ends of each of the stand halves to each other about a vertical axes; and
L. a ring splitting linear motor operative between said vehicle and said stand half connecting means to move said halves between ring stand closed and ring stand open positions.

10. The tree digging machine of claim 9 wherein said means for lifting said machine includes:
M. a pair of symmetrically spaced, vertical split ring control poles, each extending upwardly from one of the ring stand halves;
N. a split ring swing arm and brace pivotally connected to each of said control poles at lower and upper end portions of said poles and at outer ends of said swing arms and braces, inner ends thereof being pivotally mounted on vertical axes with respect to said vehicle;
O. said poles, swing arms and braces also forming part of the aforesaid means for separately supporting each ring stand half for pivotal movement about vertical axes; and
P. means on said vehicle for tipping said control poles and the ring stand about a horizontal axes.

11. The tree digging machine of claim 10; and
Q. reversible power means on said vehicle for elevating said ring stand to lift it and the digging spoons into clearing relation to the earth.

* * * * *